July 14, 1942.    V. H. MARTIN    2,289,374
ILLUMINATING MEANS FOR WATER GAUGES
Filed March 1, 1940
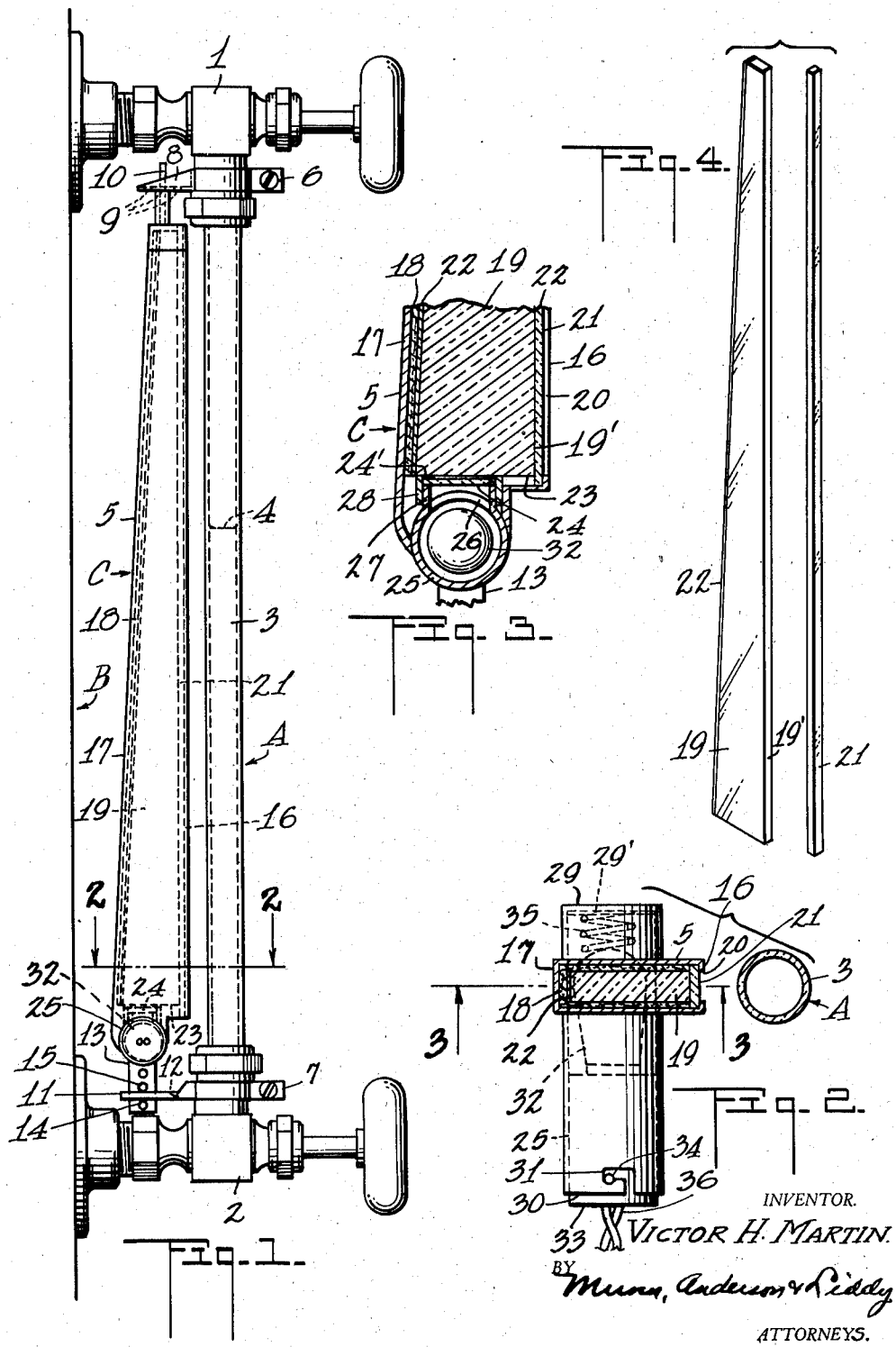
INVENTOR.
Victor H. Martin
BY Munn, Anderson & Liddy
ATTORNEYS.

Patented July 14, 1942

2,289,374

UNITED STATES PATENT OFFICE 2,289,374

ILLUMINATING MEANS FOR WATER GAUGES

Victor H. Martin, San Francisco, Calif.

Application March 1, 1940, Serial No. 321,721

1 Claim. (Cl. 73—293)

When water gauges are illuminated by direct light, it is difficult to determine the exact level of the water because both the water and tube are transparent and have approximately the same color. The difficulty is partially solved by providing the tube with a narrow line of color, such as red, this line being coextensive with the length of the tube. The water in the tube will magnify the narrow line to the full width of the tube, whereas, the empty portion of the tube will only show the actual width of the red line. In this way, the water level is easily distinguished, but the red line is not illuminated, and this precludes the use of such a tube in a dark place unless light is used.

The principal object of my invention is to provide a means for illuminating a narrow strip with colored light, the strip being coextensive with the length of the tube, and to place this illuminated strip in back of a water gauge for clearly indicating the water level within the gauge, even though the gauge is in a dark place. I have found that the amount of light necessary to illuminate the strip can be greatly reduced and a more uniform light throughout the length of the strip will result when Lucite is used.

Lucite has a high light transmission in the visible spectrum. For example, 88% of the light of from 4300 to 7500 Ångstrom units is transmitted by a two inch thickness of cast crystal Lucite. This permits the source of illumination to be disposed at one end of the Lucite strip, thus making the device more compact in design as will be described more fully hereinafter.

A further object of my invention is to provide a device of the type described, which may be quickly secured to a standard water gauge, and which has means for adjusting the illuminated colored strip into the desired position with respect to the gauge. Novel means is provided for protecting the Lucite and for supporting the latter.

Other objects and advantages will appear as the specification proceeds, and the novel features of my invention will be set forth in the claim hereto appended.

My invention is illustrated in the accompanying drawing, forming part of this specification, in which:

Figure 1 is a side elevation of the device shown operatively applied to a water gauge;

Figure 2 is a horizontal sectional view taken along the line 2—2 of Figure 1 and showing the device on a larger scale;

Figure 3 is a vertical sectional view taken along the line 3—3 of Figure 2; and

Figure 4 is a perspective view of the piece of Lucite and protecting glass.

While I have shown only the preferred form of my invention, it should be understood that various changes, or modifications, may be made within the scope of the annexed claims without departing from the spirit of the invention.

In carrying out my invention, I make use of a water gauge shown generally at A in Figure 1, this gauge being connected to a hot water boiler shown at B. The gauge A has valves 1 and 2 with a water tube 3 extending therebetween. The meniscus or water level of the liquid in the tube is shown at 4. The parts thus far described are standard construction, and form no part of my invention, except insofar as they cooperate with the parts now to be described.

The gauge illuminator is shown generally at C and it comprises a casing 5 and two supporting brackets 6 and 7. The bracket 6 is removably secured to a part of the valve 1, and the bracket 7 is clamped upon part of the valve 2. The bracket 6 has an arm 8 with a radial series of holes 9 therein. The top of the casing 5 has a pin extending vertically therefrom, which may be introduced into any one of the holes 9. In this simple manner, the top of the casing may be spaced the desired distance from the tube 3.

The lower bracket 7 has an arm 11 with a radially-extending slot 12 for receiving a support 13, the latter depending from the bottom of the casing 5. This support has openings 14 therein, which are arranged in a vertical row. A pin 15 may be passed through the opening 14 disposed immediately above the arm 11 for resting on the latter and for holding the support 13 and the casing 5 against downward movement. The lower end of the casing may be swung toward or away from the tube in order to align it with the tube, or to cause light rays to be reflected upon the tube in the manner hereinafter described. Any other means may be used for supporting the casing.

The casing 5 is narrow in width, see Figure 2, and is U-shaped in cross section. The two parallel edges of the open side of the casing are bent inwardly toward each other to form retaining flanges 16. The rear closed wall 17 of the casing is inclined as shown in Figure 1. The casing is lined on three sides with a layer of heat-resisting material, such as asbestos 18. A piece of Lucite 19 is disposed within the casing and bears against the asbestos lining. The flanges 16 define the sides of an elongated window 20 that is coextensive with the length of the casing. A strip of ordinary glass 21 is held against a polished edge 19' of the Lucite by the inwardly-turned flanges 16. The glass 21 protects the Lucite from heat, while permitting light rays to pass therethrough.

The rear edge of the Lucite is inclined to extend parallel with the rear casing wall 17, and this edge is provided with a layer of light reflecting material, such as a layer of white paint 22, see Figure 4. The lower end 23 of the Lucite 19 is larger than the upper end. A colored diffusing glass 24 is spaced from the lower end of the Lucite by a ring-shaped gasket 24'. I have chosen red for the color of the glass 24, although I do not wish to be limited thereto. A cylindrical light-receiving housing, or socket 25, extends transversely through the casing and projects laterally from both side walls thereof, see Figure 2.

The casing walls have aligned openings for receiving the housing. The portion of the housing lying within the casing side walls is provided with an opening 26 facing the end 23 of the Lucite. Flanges 27 project upwardly from the housing and hold the colored glass 24. A rectangular frame 28 telescopes over the flanges 27 and holds the glass 24 against lateral displacement. Any other suitable means may be used for supporting the colored glass in place.

The housing 25 has a closed end 29 and an open end 30, which constitutes a light-receiving socket. The open end has bayonet slots 31 therein. A light 32 is moved into the socket and its base 33 carries radially-projecting pins 34, the latter being receivable in the bayonet slots. One end of a spring 35 bears against an insulating washer 29', which in turn rests against the closed end 29 and the other end of the spring bears against the light 32 for yieldingly holding the pins 34 in the ends of the slots 31. In this simple way, the light is removably secured in the socket.

Figure 2 shows the arrangement of the light 32 and it is disposed directly below the Lucite 19. The light is preferably of six watts and will burn on a current voltage of 110 or 220 volts. This does away with the necessity of providing a transformer, or other special electrical equipment, to reduce the voltage for a special type of light. The wires 36 extend from the base 33 and can be connected to the usual electrical outlets provided in the building in which the boiler is housed.

From the foregoing description of the various parts of my device the operation thereof may be readily understood. The gauge illuminator C is mounted directly in back of the tube 3 in the manner shown in Figure 1 and the same is easily installed. The casing 5 has a depth shallow enough to permit the device to be placed between the tube and the boiler. This would be impossible if the lights were disposed in back of the glass 21 instead of at the bottom of the Lucite.

The brackets 6 and 7 permit the device to be swung into any desired angular position, and the supporting means permit the device to be disposed at the desired distance from the tube for protecting the Lucite from excessive heat. The light 32, when connected to the source of current, will project rays of light through the red glass 24 and here the rays will be uniformly diffused and projected into the Lucite member 19.

The substantial uniform lighting of the glass 21 and the consequent uniform lighting of the gauge A is the result of using a wedge-shaped piece of Lucite with a polished edge 19' and a reflecting inclined surface 22. The rays of light entering the base of the wedge will be uniformly projected from the reflecting surface 22 toward and through the polished edge 19'.

In actual practice, it was noted that the red light slightly tapers off in brightness from the lower end of the window 21 to the upper end. This arrangement permits an accurate reading when the meniscus 4 is low in the tube 3. The illuminated red window will be magnified by the water in the tube to make this portion appear bright red from side to side of the tube.

The portion of the red window viewed through the empty tube, that is, that part above the meniscus, will appear narrow and therefore the sudden change of a wide red line to a narrow one will distinctly show a correct reading. A tube full of water or empty of water can be readily distinguished because the red line will be as wide as the diameter of the tube in the first case and only as wide as the actual window width in the second case. This is a safety feature against danger from a boiler completely filled with water, or entirely empty.

It is unnecessary to use a red line glass tube with my device. A plain glass tube can be employed and the readings can be made in the dark, because the illuminated window 21 will indicate the water level. This is not possible with the red line tube. Mirrors (not shown) may be arranged at appropriate angles to the casing 5 to permit readings to be taken from different angular positions. It is possible to mount more than one of the devices on a tube and arrange them in the desired radial positions for effecting readings from different angles.

The device is light in weight, about one fourth of a pound, and this permits ease of assembly to the tube. The cost of the burning of a small electric light continuously is negligible. The illumination of the tube from the rear does away with any reflected light which results when a light is focused against the front of the tube. The casing 5 is preferably made from aluminum so as to reduce the weight thereof, and it may be colored black in order to be non-reflecting. The light can burn on either A. C. or D. C. current.

Lucite will soften under temperature from about 190° to 240° F., and, therefore, I protect it by a layer of asbestos 18 and the ordinary glass 21. The casing and window support the Lucite in the event that the latter softens due to excessive heat. The front edge 19' of the Lucite is preferably polished to permit light rays to pass therethrough and thereby illuminate the tube 3. The water in the tube is usually around 130° to 212° F., and the air space between the tube and the window 21 helps to dissipate this heat before it strikes the window glass. It is possible to omit the colored glass 24, but I have found that it is advisable to use it, because the red color acts as a warning signal.

In case that lights were placed in back of the glass 21 instead of the Lucite, the window would be spotted with light and too much space would be required for accommodation of the lights, thus preventing the device from being placed between the tube and the boiler. Additional current would be required for several lights and this would increase the cost of operation. Moreover, Lucite permits the use of a thin casing, which would be impossible if several lights were used. Lucite conserves all of the light and projects it against the window. The housing 25 can be made for right or left hand positions for the light socket. The latter may have openings (not shown) for ventilating purposes and draining any condensation that might collect.

I claim:

A device for projecting an elongated narrow beam of light through a translucid liquid holding gauge throughout its length comprising a tapered piece of Lucite having a length substantially coextensive with the length of the gauge, one edge of the Lucite being polished and disposed substantially parallel to the gauge, the opposite edge of the Lucite being inclined towards the gauge and having a reflecting surface for directing light rays toward and through the polished edge of the Lucite, a casing enclosing the Lucite and provided with a narrow slit at the polished edge, and a light source placed at the bottom of the Lucite for directing light rays thereinto, said projected beam being narrower than the internal diameter of the gauge so that when the narrow beam is directed through the gauge, that portion of the gauge containing a liquid will be illuminated entirely throughout its width while the illumination above the liquid will appear as a narrow band.

VICTOR H. MARTIN.